United States Patent
Jhang et al.

(10) Patent No.: US 9,232,411 B2
(45) Date of Patent: Jan. 5, 2016

(54) SYSTEMS AND METHODS FOR ROUTING HOME AREA NETWORK (HAN) MESSAGES

(71) Applicant: GENERAL ELECTRIC COMPANY, Schenectady, NY (US)

(72) Inventors: Hyoung Jhang, Atlanta, GA (US); David Sampson, Atlanta, GA (US); Jeremy McKeown, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 85 days.

(21) Appl. No.: 13/670,285

(22) Filed: Nov. 6, 2012

(65) Prior Publication Data

US 2014/0126560 A1    May 8, 2014

(51) Int. Cl.
*H04L 12/28* (2006.01)
*H04W 24/02* (2009.01)
(Continued)

(52) U.S. Cl.
CPC ............... *H04W 24/02* (2013.01); *G01D 4/002* (2013.01); *H04L 12/2803* (2013.01); *H04L 12/2836* (2013.01); *H04L 12/2838* (2013.01); *H04L 67/125* (2013.01); *H04Q 9/00* (2013.01); *H04Q 2209/60* (2013.01)

(58) Field of Classification Search
CPC .................. H04L 43/0817; H04L 2012/2847; H04L 67/12; H04L 67/125; H04L 12/2803–12/2838; H04W 84/18; H04W 24/02; H04W 4/005; H04W 92/06; G01D 4/004–4/008; G01D 4/002; G01R 22/063; Y04S 20/42; Y04S 20/48; Y04S 20/30–20/525; Y04S 20/228; Y02B 90/246; Y02B 90/242; Y02B 70/325; Y02S 40/24; H02J 13/0017; H04Q 9/00; H04Q 2209/60

USPC .............. 340/870.02; 709/224; 370/245, 252, 370/328, 338, 400
See application file for complete search history.

(56) References Cited

U.S. PATENT DOCUMENTS 8,026,830 B2 * 9/2011 Womble et al. .......... 340/870.02
8,502,640 B2 * 8/2013 Veillette .......................... 340/3.1
(Continued)

FOREIGN PATENT DOCUMENTS

EP    2456227 A2    5/2012
EP    2498060 A2    9/2012
EP    2515406 A1    10/2012

OTHER PUBLICATIONS

Heile, Robert F. , "802 Smart Grid Tutorial ZigBee Smart Energy", Nov. 2009, IEEE 802.15-09-0770-00, 23 Pages.*

(Continued)

*Primary Examiner* — Edan Orgad
*Assistant Examiner* — Ivan O Latorre
(74) *Attorney, Agent, or Firm* — Sutherland Asbill & Brennan LLP

(57) ABSTRACT

Embodiments of the disclosure can provide systems and methods for routing home area network (HAN) messages. In one embodiment, a system can be provided. The system can include at least one memory that stores computer-executable instructions; at least one processor configured to access the at least one memory, wherein the at least one processor is configured to execute the computer-executable instructions. The computer-executable instructions can receive, by the at least one processor, an instruction for a HAN gateway; send the instruction to a transmission agent for routing to the HAN gateway; and transmit, by the transmission agent, the instruction to the HAN gateway.

20 Claims, 3 Drawing Sheets

(51) Int. Cl.
*H04L 29/08* (2006.01)
*G01D 4/00* (2006.01)
*H04Q 9/00* (2006.01)

(56) References Cited

U.S. PATENT DOCUMENTS

| | | | |
|---|---|---|---|
| 2008/0068217 A1* | 3/2008 | Van Wyk et al. | 340/870.11 |
| 2008/0068994 A1* | 3/2008 | Garrison Stuber et al. | 370/230 |
| 2008/0094248 A1 | 4/2008 | Lakich | |
| 2008/0186871 A1* | 8/2008 | Trevino et al. | 370/252 |
| 2009/0079584 A1* | 3/2009 | Grady et al. | 340/870.02 |
| 2011/0063126 A1* | 3/2011 | Kennedy et al. | 340/870.02 |
| 2012/0036250 A1* | 2/2012 | Vaswani et al. | 709/224 |
| 2012/0201145 A1* | 8/2012 | Ree et al. | 370/245 |
| 2012/0229296 A1* | 9/2012 | Ree | 340/870.02 |
| 2012/0242499 A1* | 9/2012 | Ree | 340/870.02 |
| 2012/0250864 A1* | 10/2012 | Nishibayashi et al. | 380/278 |
| 2013/0262844 A1* | 10/2013 | Hester | 713/1 |
| 2013/0275736 A1 | 10/2013 | Kelley et al. | |

OTHER PUBLICATIONS

European Search Report issued in connection with corresponding EP Application No. 13190625.7, Jan. 30, 2014.

* cited by examiner

SYSTEMS AND METHODS FOR ROUTING HOME AREA NETWORK (HAN) MESSAGES

FIELD OF THE DISCLOSURE

Embodiments of the disclosure relate generally to communications, and more particularly to systems and methods for routing home area network (HAN) messages.

BACKGROUND OF THE DISCLOSURE

Wide varieties of conventional utility meters are configured to measure consumption and/or communicate with other network devices. For example, advanced metering infrastructure (AMI) smart meters can be configured to transmit messages containing consumption data and/or other monitoring data to household appliances as well as servers and/or controllers. Over time, transmission of numerous messages by a smart meter can consume a non-negligible amount of power.

SUMMARY

Some or all of the above needs and/or problems may be addressed by certain embodiments of the disclosure. Disclosed embodiments may include systems and methods for routing home area network (HAN) messages.

According to one embodiment in the application, there is a disclosed system including at least one memory that stores computer-executable instructions. The system can include at least one processor configured to access the at least one memory, wherein the at least one processor is configured to execute the computer-executable instructions. The computer-executable instructions can receive, by the at least one processor, an instruction for a home area network (HAN) gateway; send the instruction to a transmission agent for routing to the HAN gateway; and transmit, by the transmission agent, the instruction to the HAN gateway.

According to another embodiment of the invention, there is disclosed a method. The method can include receiving, by at least one processor configured to access at least one memory, an instruction for a home area network (HAN) gateway; sending the instruction to a transmission agent for routing to the HAN gateway; and transmitting, by the transmission agent, the instruction to the HAN gateway.

Further, according to another embodiment of the invention, there is disclosed one or more computer-readable media storing computer-executable instructions that, when executed by at least one processor, configure the at least one processor to perform certain operations. The operations can include receiving, from an advanced metering infrastructure (AMI) network interface card (NIC) an American National Standards Institute (ANSI) C12.19 standard procedure instruction for a home area network (HAN) gateway; sending the standard procedure instruction to a transmission agent for routing to the HAN gateway; transmitting, by the transmission agent, the standard procedure instruction to the HAN gateway; receiving, from the HAN gateway, HAN device data; sending the HAN device data to a receiving agent for routing to an AMI NIC; and transmitting, by the receiving agent, the HAN device data to the AMI NIC, wherein the HAN gateway, the transmission agent, the receiving agent, and the AMI NIC are integrated within a metering device comprising the at least one processor.

Other embodiments, systems, methods, computer-readable media, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION

Figure 1:
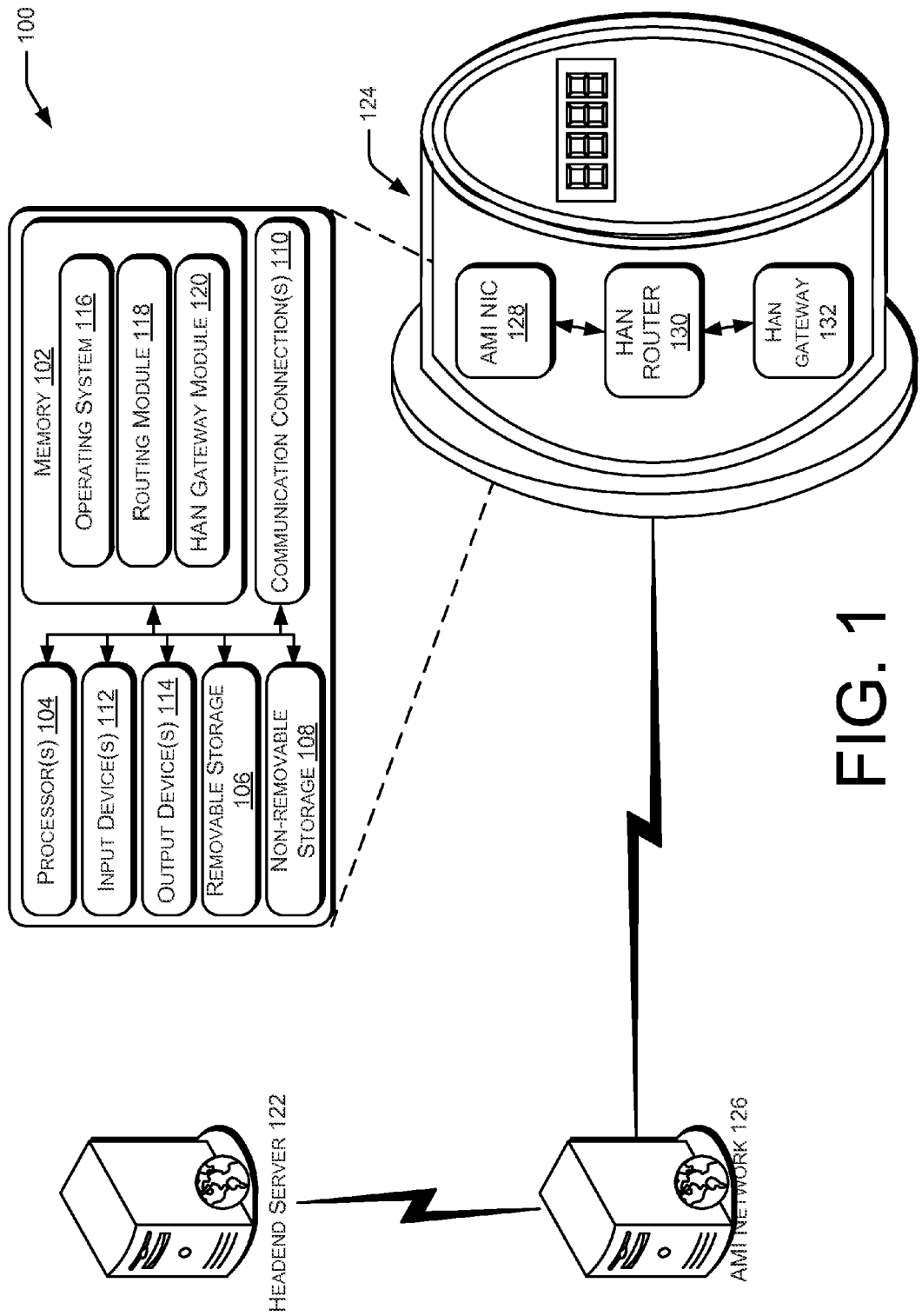
FIG. 1 is a schematic block diagram of a utility meter connected to a home area network (HAN) in communication with an advanced metering infrastructure (AMI) and a headend server according to an embodiment of the disclosure.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. Like numbers refer to like elements throughout.

Illustrative embodiments of the disclosure are directed to systems and methods for routing home area network (HAN) messages. Certain embodiments can be implemented for routing messages to home area network (HAN) devices from an advanced metering infrastructure (AMI) network using manufacturer procedures. In some examples, the metering devices may include network devices such as, but not limited to, demand response meters, smart meters, AMI devices, and/or HAN devices. In some aspects, certain embodiments can provide messages and/or instructions to HAN devices based on a wide variety of factors and/or scenarios. For example, messages and/or instructions may be transmitted to the HAN from the AMI using certain manufacturer procedures provided by the manufacturer of the HAN devices. In certain examples, manufacturer procedures may be stored in an encoded table where certain subsections of the table can be decoded for certain instructions. For example, if the messages and/or instructions may, in some cases, instruct the meter to put the HAN devices in a low power mode for a predetermined amount of time, the message may come from a headend server of an AMI network server. However, there may be no direct way to communicate with a particular HAN device. The metering device may encode the received message and route it to the proper HAN device. The encoded message may be in a form of a manufacturer procedure for the device to receive and decode.

When utility companies or other electricity providers generate and/or provide electricity to a grid, the grid may provide electricity to customers who consume the electricity or to other utility companies. Additionally, in some examples, a headend server may be utilized for controlling one or more other sub-grids, electricity networks, and/or other consumers or customers. Further, in some examples, the headend server may provide instructions to one or more networks of devices, each network including one or more AMI devices, smart meters, HAN devices, and/or household appliances. As such, the headend server may be configured to place one or more of the elements (i.e., devices) into a low power mode (i.e., a load shedding mode). For example, a portion of an AMI system may be placed in a low power mode to reduce potentially wasted power used by the AMI radios. In some examples, this may be especially useful during peak usage time. Further, and by way of example only, the headend server may be configured to generate one or more load control signals or messages for a group (i.e., a network) of HAN devices. The message may include a group ID, a start time, a length of low power mode, and/or an indication of the length of a low power mode. The message may be in an XML format or other format accessible by the meter. The meter may then encode the message as a manufacturer procedure to be read by the HAN device. The manufacturer procedure instruction may comprise at least one of a sequence field, an index field, a count field, a size field, or at least one HAN message field.

FIG. 1 is a schematic block diagram of an embodiment of a utility meter connected to a HAN in communication with an AMI network and a headend server, according to an embodiment of the disclosure. In one embodiment, the system 100 may include a headend server 122 configured to connect to one or more AMI networks 126. The AMI network 126 may connect to, but is not limited to, the Internet, other public networks and/or private networks. In this particular embodiment, the AMI network 126 is in communication with a utility meter 124. The utility meter 124 may be located at a residence, office building, or any other location that utilizes power from the power company. The AMI network 126 and the utility meter 124 may comprise the HAN gateway. Further, the utility meter 124 may contain an AMI network interface card (NIC) 128. The AMI NIC 128 may be configured with electric circuitry or implemented using software or other possible methods. The AMI NIC 128 is configured to provide a data link between the AMI network 126 and the HAN devices. The AMI NIC 128 may be connected to a HAN router 130. The HAN router 130 may be implemented as appropriate in hardware, software, firmware, or combinations thereof. Software or firmware implementations of the HAN router 130 may include computer-executable or machine-executable instructions written in any suitable programming language to perform the various functions described. The HAN router 130 may be configured to route messages and instructions from the AMI NIC 128 to a HAN gateway 132. The HAN gateway 132 may be implemented as appropriate in hardware, software, firmware, or combinations thereof. Software or firmware implementations of the HAN gateway 132 may include computer-executable or machine-executable instructions written in any suitable programming language to perform the various functions described. The HAN gateway 132 may maintain connectivity between various HAN devices (not shown). The HAN gateway 132 may communicate with the HAN devices using the existing electrical connections. In other embodiments, the HAN gateway 132 may communicate with the HAN devices using a local area network (LAN) or a neighborhood area network (NAN).

In this particular configuration, the utility meter 124 may connect the HAN devices (not shown). The HAN devices may not contain an interface to communicate directly with the AMI network 126. The utility meter 124 may comprise at least a memory 102 and one or more processing units (or processor(s)) 104. The processor(s) 104 may be implemented as appropriate in hardware, software, firmware, or any combination thereof. Software or firmware implementations of the processor 104 may include computer-executable or machine-executable instructions written in any suitable programming language to perform the various functions described. The utility meter 124 may also contain one or more communication connections 110 that allow the computing device to communicate with a stored database, another computing device or server, user terminals, and/or other devices on a network.

The memory 102 may store program instructions that are loadable and executable on the processor(s) 104, as well as data generated during the execution of these programs. Depending on the configuration and the type of utility meter 124, the memory 102 may be volatile (such as random access memory (RAM)) and/or non-volatile (such as read-only memory (ROM), flash memory, etc.). The utility meter 124 may also include additional removable storage 106 and/or non-removable storage 108 including, but not limited to, magnetic storage optical discs and/or tape storage. The associated computer-readable media may provide—non-volatile storage of computer-readable instructions, data structures, program modules, and other data for the computing devices. In some implementations, the memory 102 may include multiple different types of memory, such as static random access memory (SRAM), dynamic random access memory (DRAM), or ROM.

The memory 102, the removable storage 106, and the non-removable storage 108 are all examples of computer-readable storage media. For example, computer-readable storage media may include volatile and non-volatile, movable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes magnetic tape, magnetic disk storage or other magnetic storage devices, or any other medium which can be used to store the desired information and which can be accessed by the server or other computing devices. Combination of any of the above also should be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Turning to the contents of the memory 102 in more detail, the memory 102 may include an operating system 116 and one or more application programs or services for implementing the features disclosed herein including a routing module 118 and a HAN gateway module 120. In certain aspects, the routing module 118 may be configured to route messages received from the HAN devices through the HAN gateway module 120 to the AMI network 126. The routing module 118 may also be configured to determine and encode the message to the appropriate HAN device.

Further, the HAN gateway module 120 is configured to transmit messages to the HAN devices using a wireless standardized protocol such as the wireless ZIGBEE® protocol. The messages may be encoded in an appropriate manufacturer procedure for each HAN device. The message may be transmitted between the utility meter 124 (HAN gateway) and the HAN devices using a protocol such as the wireless ZIGBEE® protocol. In certain examples, wireless ZIGBEE® may be a specification configured to transmit high level communication messages using small, low-power digital radios based on an IEEE 802 standard for personal area networks. Many HAN gateway modules 120 may be configured with low-powered digital radios to transmit similar protocols such as wireless ZIGBEE® to HAN devices. HAN gateway modules 120 may be used in mesh network form to transmit data over longer distances, passing data through intermediate devices to reach more distant ones. Hence, the HAN devices may be configured to form an ad-hoc network.

Figure 2:
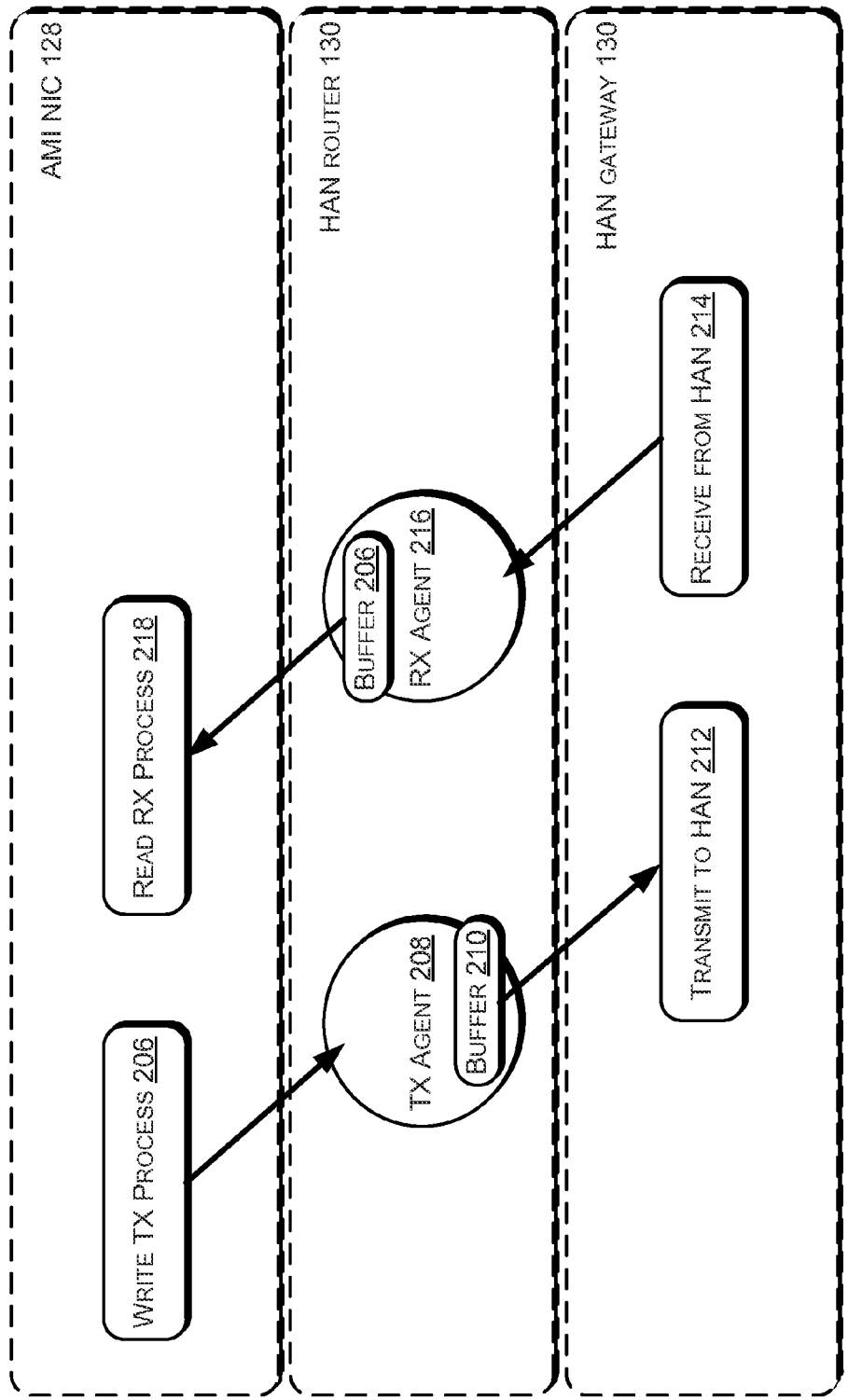
FIG. 2 is a flow chart of an illustrative communication system between an AMI network interface card (NIC) and a HAN gateway to encode a message for HAN devices according to an embodiment of the disclosure.

FIG. 2 is a flow chart of an example method for communications between an AMI NIC and a HAN gateway to encode a message for HAN devices, according to an embodiment of the disclosure. In operation block 206, a message may be received from the AMI network 126 to the AMI NIC 128. The AMI NIC 128 may write a transmission (TX) process, which in certain embodiments may be written in tabular format. The TX process may be a manufacturer procedure that is configured for a particular HAN device.

At operation block 208, the HAN router 130 may identify a routing protocol or the transmission process message. In certain embodiments, the routing procedure may be bits encoded in the message indicating the HAN device for which the message is indicated. The routing module 118 may route HAN messages between the AMI NIC 128 and the HAN gateway 132. The routing module 118 may identify the HAN devices for which the messages are addressed. In operation block 210, the message may be buffered to be transmitted to the HAN device. The buffer may provide capacity to store the message prior to transmission if there is a queue of messages to be transmitted.

At operation block 212, the message is transmitted to the HAN device by the HAN gateway 132. The HAN gateway 132 may determine which HAN device to transmit the message and transmit the message using a wireless protocol such as a wireless ZIGBEE®.

At operation block 214, the HAN gateway 132 may receive an encoded message from the HAN device. In certain embodiments, the HAN device may be configured to transmit the message from a wireless protocol Therefore, the HAN gateway 132 may be configured to receive the message from the HAN device through a wireless protocol such as a wireless ZIGBEE®. The HAN gateway 132 may be configured to transmit the manufacturer procedure to the HAN router 130.

At operation block 216, the read (RX) agent in the routing block may identify the origination point of the message and transmit it to the AMI NIC 128. The HAN router 130 may be configured to identify various HAN device messages in varying formats. The HAN router 130 may also have a buffer 206 because the HAN router 130 may be configured to receive various messages.

At operation block 218, the message may be read by the read process in the AMI NIC 128. The read agent may be configured to read the message from the HAN router 130 and convert the message into a format to transmit to the AMI network 126.

Figure 3:
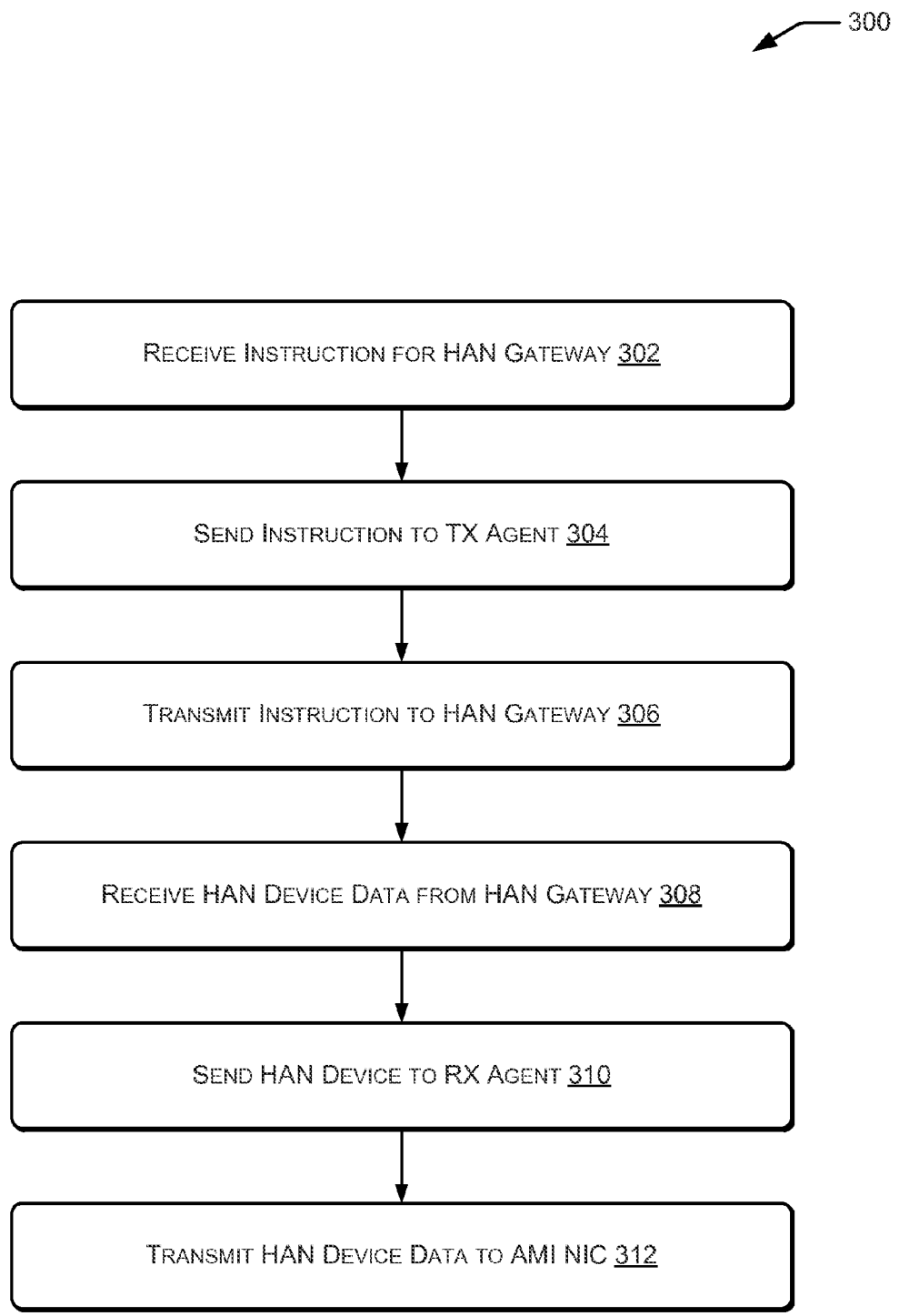
FIG. 3 is a flow chart of an example method according to an embodiment of the disclosure.

FIG. 3 is a flow chart indicating an example method 300 to implement HAN routing using a manufacturer procedure according to an embodiment of the disclosure. In method 300, in one example, the operation may be performed by a headend server 122, an AMI NIC 128, an AMI network 126, a HAN gateway module 120, or any combinations thereof. At operation block 302, the AMI network 126 may receive an instruction for the HAN gateway. The instruction may be in a format accepted by the Smart Energy Profile 2.0 standard such as XML. Alternatively, the instruction may be encoded in another format accessible by the AMI network 126. The instruction may identify a device in the HAN gateway 132 and may be used to control the HAN device. The instruction received through the AMI network 126 may be transmitted to the AMI NIC 128 for processing.

At operation block 304, the instruction is sent to a transmission (TX) agent. The TX agent may encode the instruction in a format readable by the HAN device. The TX agent may also encode the location of the HAN device within the manufacturer procedure.

At operation block 306, the manufacturer procedure may be transmitted to the HAN gateway 132. The HAN gateway 132 may provide an interface to transmit the instruction to the HAN device. In one example, the instruction may be to change a setting on a HAN device. In other examples, the instruction may put certain HAN devices in low power mode.

At operation block 308, the HAN gateway 132 may receive data from the HAN device. The HAN device may use a format such as an SEP to transmit the HAN message over a wireless protocol such as a wireless ZIGBEE®. In one example, the HAN device may transmit data regarding its current state. In other aspects, the HAN device may transmit instructions for the HAN gateway.

At operation block 310, the HAN device data may be transmitted to the read agent in the HAN router 130. The data may be transmitted through the HAN router 130. The read agent may read the instructions written in the manufacturer procedures by the AMI NIC 128.

At operation block 312, the HAN device data may be transmitted to the AMI NIC 128. The AMI NIC 128 may be connected to the HAN router 130. Therefore, the instructions may be transmitted to the AMI NIC 128. The AMI NIC 128 may communicate with the AMI network.

Illustrative systems and methods for implementing a communication mechanism between an AMI and a HAN are described above. Some or all of these systems and methods may, but need not, be implemented at least partially by architectures such as those shown in FIG. 1 above.

It should be noted that the method 300 may be modified in various ways in accordance with certain embodiments of the disclosure. For example, one or more operations of the method 300 may be eliminated or executed out of order in other embodiments of the disclosure. Additionally, other operations may be added to the method 300 in accordance with other embodiments of the disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed:

1. A system comprising:
  a metering device coupled to a home area network (HAN) in communication with an advanced metering infrastructure (AMI) network, the metering device comprising:
  an AMI network interface card (NIC) configured to provide a data link between the AMI network and one or more HAN devices;
  at least one memory that stores computer-executable instructions;
  at least one processor configured to access the at least one memory, wherein the at least one processor is configured to execute the computer-executable instructions to:
    receive, by the at least one processor, an instruction for a home area network (HAN) gateway;
    send the instruction to a transmission agent for routing to the HAN gateway;

transmit, by the transmission agent, the instruction to the HAN gateway; and transmit the instruction, by the HAN gateway, to the one or more HAN devices using one or more manufacturer procedures of the one or more HAN devices, wherein the instruction comprises at least one HAN message having a smart energy profile format, and wherein the HAN gateway, the transmission agent, and the AMI NIC are integrated within the metering device.

2. The system of claim 1, wherein the at least one processor is further configured to execute the computer-executable instructions to receive, from the HAN gateway, HAN device data.

3. The system of claim 2, wherein the at least one processor is further configured to execute the computer-executable instructions to send the HAN device data to a receiving agent for routing to the advanced metering infrastructure (AMI) network interface card (NIC).

4. The system of claim 3, wherein the at least one processor is further configured to execute the computer-executable instructions to transmit, by the receiving agent, the HAN device data to the AMI NIC.

5. The system of claim 3, wherein at least one of the transmission agent or the receiving agent comprises a buffer.

6. The system of claim 3, wherein the receiving agent is integrated within the metering device.

7. The system of claim 2, wherein the instruction for the HAN gateway is received from the AMI NIC.

8. The system of claim 1 wherein the instruction for the HAN gateway comprises a procedure instruction.

9. The system of claim 8, wherein the procedure instruction comprises at least one of a sequence field, an index field, a count field, a size field, and at least one HAN message field.

10. The system of claim 9, wherein the at least one HAN message field indicates an index of the instruction for the HAN gateway.

11. The system of claim 8, wherein the transmission agent transmits the instruction to the HAN gateway via a serial peripheral interface (SPI) connection.

12. A method, comprising:
coupling a metering device to a home area network (HAN) in communication with an advanced metering infrastructure (AMI) network;
configuring an AMI network interface card (NIC) to provide a data link between the AMI network and one or more HAN devices;
receiving, by at least one processor configured to access at least one memory, an instruction for a home area network (HAN) gateway;
sending the instruction to a transmission agent for routing to the HAN gateway;
transmitting, by the transmission agent, the instruction to the HAN gateway; and
transmitting the instruction, by the HAN gateway, to the one or more HAN devices using one or more manufacturer procedures of the one or more HAN devices, wherein the instruction comprises at least one HAN message having a smart energy profile format, and wherein the HAN gateway, the transmission agent, and the AMI NIC are integrated within the metering device.

13. The method of claim 12, further comprising receiving, from the HAN gateway, HAN device data.

14. The method of claim 12, further comprising sending the HAN device data to a receiving agent for routing to the advanced metering infrastructure (AMI) network interface card (NIC) and transmitting, by the receiving agent, the HAN device data to the AMI NIC.

15. The method of claim 14, wherein the receiving agent is integrated within the metering device.

16. The method of claim 12, wherein the instruction for the HAN gateway is received from the AMI NIC.

17. The method of claim 12, wherein the instruction for the HAN gateway comprises a standard procedure instruction, and the standard procedure instruction comprises at least one of a sequence field, an index field, a count field, a size field, or at least one HAN message field.

18. The method of claim 17, wherein the at least one HAN message field indicates an index of the instruction for the HAN gateway.

19. The method of claim 12, wherein the transmission agent transmits the instruction to the HAN gateway via a serial peripheral interface (SPI) connection.

20. One or more non-transitory computer-readable media storing computer-executable instructions that, when executed by at least one processor, configure the at least one processor to perform operations comprising:
receiving, from an advanced metering infrastructure (AMI) network interface card (NIC) an American National Standards Institute (ANSI) C12.19 standard procedure instruction for a home area network (HAN) gateway;
sending the standard procedure instruction to a transmission agent for routing to the HAN gateway;
transmitting, by the transmission agent, the standard procedure instruction to the HAN gateway;
receiving, from the HAN gateway, HAN device data;
sending the HAN device data to a receiving agent for routing to an AMI NIC; and
transmitting, by the receiving agent, the HAN device data to the AMI NIC using one or more manufacturer procedures of the one or more HAN devices, wherein the instruction comprises at least one HAN message having a smart energy profile format, and wherein the HAN gateway, the transmission agent, the receiving agent, and the AMI NIC are integrated within a metering device comprising the at least one processor.

* * * * *